(12) United States Patent
Hansen et al.

(10) Patent No.: US 7,748,747 B2
(45) Date of Patent: Jul. 6, 2010

(54) INDIVIDUALIZED SECURITY DOCUMENT

(75) Inventors: Achim Hansen, Zug (CH); John Anthony Peters, Au (CH)

(73) Assignee: OVD Kinegram AG, Zug (CH)

( * ) Notice: Subject to any disclaimer, the term of this patent is extended or adjusted under 35 U.S.C. 154(b) by 52 days.

(21) Appl. No.: 11/660,069

(22) PCT Filed: May 9, 2005

(86) PCT No.: PCT/EP2005/004752

§ 371 (c)(1),
(2), (4) Date: May 21, 2007

(87) PCT Pub. No.: WO2006/018052

PCT Pub. Date: Feb. 23, 2006

(65) Prior Publication Data

US 2007/0246931 A1    Oct. 25, 2007

(30) Foreign Application Priority Data

Aug. 13, 2004   (DE) .................. 10 2004 039 567

(51) Int. Cl.
*G09C 3/00* (2006.01)
*B42D 15/00* (2006.01)
*B42D 15/10* (2006.01)
*B42D 1/00* (2006.01)

(52) U.S. Cl. .................. 283/75; 281/15.1; 283/63.1; 283/72; 283/74; 283/77; 283/83; 283/107; 283/108; 283/901

(58) Field of Classification Search ............. 162/140, 162/158, 164.1, 168.1; 281/26, 27; 283/57, 283/63.1, 72, 74, 75, 76, 77, 78, 83, 85, 86, 283/87, 90, 91, 107, 109, 900, 904; 412/28, 412/35; 428/29, 203, 204; 430/10, 14, 280, 430/285, 288, 293, 910, 912; 522/79, 102; 713/186; 726/20; 235/487, 492, 493; *B42D 15/00, B42D 15/02; D21H 17/33, 17/55, 21/40, D21H 21/48; G03C 1/68; G06K 5/00, 19/06; H04K 1/00; H04L 9/32*

See application file for complete search history.

(56) References Cited

U.S. PATENT DOCUMENTS 2,147,408 A * 2/1939 Kaufer .................. 281/3.1
4,220,956 A    9/1980 Sanford (Continued)

FOREIGN PATENT DOCUMENTS

| DE | 197 32 712 A1 | 2/1998 |
|---|---|---|
| WO | WO 98/19870 | 5/1998 |
| WO | WO 2004/011272 | 2/2004 |

OTHER PUBLICATIONS

Reisepass der EG, issued in 1991.

*Primary Examiner*—Dana Ross
*Assistant Examiner*—Justin V Lewis
(74) *Attorney, Agent, or Firm*—Hoffman & Brown, LLP (57) ABSTRACT

The invention concerns an individualized security document (1) and a method of individualizing a security document. The individualized security document (1) has a number of pages (12 to 15) which are connected together by means of stitching or adhesive. In addition integrated into the security document by means of stitching and adhesive is a single-layer or multi-layer film body (2) which is provided with an individualized optical security element and which is folded in the region of the stitching or adhesive. The fold divides the film body (2) into a first part (21) on which the individualized optical security element is arranged and a second, preferably flap-shaped part (22) which is permanently connected to a plastic body having at least one machine-readable security element, wherein the at least one machine-readable security element has an electronic circuit for RF identification.

25 Claims, 3 Drawing Sheets

U.S. PATENT DOCUMENTS

| | | | | |
|---|---|---|---|---|
| 4,708,560 | A | * | 11/1987 | Abildgaard et al. ............. 412/7 |
| 5,211,424 | A | * | 5/1993 | Bliss .......................... 281/15.1 |
| 5,528,222 | A | | 6/1996 | Moskowitz et al. |
| 5,760,386 | A | * | 6/1998 | Ward .......................... 235/493 |
| 5,897,144 | A | | 4/1999 | Uno ............................. 283/77 |
| 6,100,804 | A | * | 8/2000 | Brady et al. .............. 340/572.7 |
| 2003/0168514 | A1 | * | 9/2003 | Rancien et al. .............. 235/492 |
| 2003/0173408 | A1 | * | 9/2003 | Mosher et al. .............. 235/492 |
| 2005/0248147 | A1 | * | 11/2005 | Staub et al. ................... 283/72 |
| 2006/0251863 | A1 | * | 11/2006 | Katschorek et al. ......... 428/172 |

* cited by examiner

INDIVIDUALIZED SECURITY DOCUMENT

This application claims priority based on an International Application filed under the Patent Cooperation Treaty, PCT/EP2005/004752, filed on May 9, 2005 and German Application No. 102004039567.5, filed on Aug. 13, 2004.

FIELD OF THE INVENTION

The invention concerns an individualised security document, in particular a passport, which has a number of pages which are connected together by means of stitching or adhesive. The invention further concerns a method of individualising such a security document.

BACKGROUND OF THE INVENTION

A passport which has a number of pages which are connected together by means of stitching or adhesive is described for example in WO 2004/011272 A2. A transfer film is further incorporated into that passport by stitching or adhesive. The transfer film has a base film and a detachable decorative layer arrangement which is releasable from the base film. In that case the decorative layer arrangement has a replication lacquer layer with a structure which has a holographic or optical-diffraction effect, as well as an adhesive layer by means of which the decorative layer can be joined to a page of the passport. For the purpose of individualising the security document the adhesive layer of the decorative layer arrangement is provided with an individualised print thereon. The adhesive layer is then activated and in that way the decorative layer arrangement is joined to the adjacent page of the passport. The base film is then removed from the decorative layer arrangement, in which case a perforation is provided in the base film in the region of the binding or stitching so that the base film can then be removed from the passport.

It is further known for passports to be fitted with RF identification circuits (RF=radio frequency).

Because of the thickness and mechanical flexibility of RF identification circuits, such circuits are in this case usually fixed on or in the cover of a passport, which is of a greater thickness and is of higher mechanical stability than the individual pages of the passport.

Thus for example U.S. Pat. No. 4,220,956 describes an RF identification circuit having a series of antennae which are produced by means of an etching process from a copper laminate. The copper laminate is applied to a dielectric. As the dielectric does not afford any electrical function it can be very thin, whereby the mechanical flexibility of the RF identification circuit is increased.

Furthermore U.S. Pat. No. 5,528,222 describes an RF identification circuit which reflects an RF carrier emitted by a base station back to the base station and in so doing modulates onto the reflected signal additional information in accordance with a pre-programmed information protocol. The RF identification circuit has a semiconductor circuit with a memory and one or more RF components of an RF circuit. The semiconductor circuit is mounted on a substrate. The RF signal received by the antenna is passed to the semiconductor circuit. The substrate is a flexible, non-conducting substrate. The antenna is an integral constituent part of the substrate. It comprises a 25 to 35 μm thick track applied to a polyester or polyamide layer. That provides that the thickness of the RF identification circuit does not exceed the thickness of the passport cover and the RF identification circuit can thus be arranged in the cover of the passport.

SUMMARY OF THE INVENTION

Now the object of the present invention is to improve the forgery-proof nature of an individualised security document.

That object is attained by an individualised security document having a number of pages which are connected together by means of stitching or adhesive and into which moreover there is incorporated by means of stitching or adhesive a single-layer or multi-layer film body which is provided with an individualised optical security element and which is folded in the region of the stitching or adhesive, wherein the fold divides the film body into a first part on which the individualised optical security element is arranged and a second, preferably flap-shaped part which is permanently connected to a plastic body having at least one machine-readable security element, and wherein the at least one machine-readable security element has an electronic circuit for RF identification.

The invention is further attained by a method of individualising a security document which has a number of pages which are connected together by means of stitching or adhesive, in which a single-layer or multi-layer film body which is incorporated into the security document by means of stitching or adhesive and which is folded in the region of the stitching or adhesive and in which the fold divides the film body into a first part and a second, preferably flap-shaped part, is provided in the first part with an individualised optical security element and the second part is permanently connected to a plastic body having at least one machine-readable security element, wherein the at least one machine-readable security element has an electronic circuit for RF identification.

The invention achieves numerous advantages. Thus it is possible to provide a modularly expandable security element which can be provided with further machine-readable security elements at a later time, in particular after the provision of the necessary technical and legal foundations. In that respect the invention ensures that the individualised optical security elements and the additional machine-readable security elements are tightly connected together on the one hand by the film body, whereby attempts at manipulation can be quickly detected, but on the other hand they are decoupled from each other in relation to the parameters of optical impression and thickness.

The electronic circuit for RF identification is permanently connected by the invention to the film body which affords the individualised optical security element. Separation of the individualised optical security element and the electronic circuit for RF identification from each other is not possible without destroying the film body. Destruction of the film body is easy to detect so that forgeries can be recognised immediately. The fold of the film body and the arrangement of the individualised optical security element and the RF circuit in different parts of the film body provides that machine readability of the individualised optical security element is not adversely affected by the application of the RF identification circuit and moreover the thickness, mechanical flexibility and optical impression of the part of the film body which has the individualised security element is not influenced by the RF identification circuit. The individualised optical security element and the RF identification circuit are thus decoupled in relation to those parameters, but on the other hand they are closely joined together by the film body so that forgeries become immediately obvious.

Advantageous configurations of the invention are set forth in the appendant claims.

In addition it is also possible for the plastic body, beside the RF identification circuit, to have at least one further machine-readable security element. The further machine-readable security element can involve a security element which has an item of magnetically or electrically encoded individualised information. By way of example the plastic body has further electrical circuits or a partial magnetic or electrically conductive layer in which individualised items of information are encoded in the manner of a bar code. In addition it is also possible for the plastic body to have an optical further machine-readable security element, for example a diffractive structure, the diffraction characteristics of which encode an item of individualised information or an item of information which can be read out by means of infrared radiation.

In accordance with a preferred embodiment of the invention the single-layer or multi-layer film body and the plastic body having the at least one machine-readable security element are welded together. That achieves a secure non-releasable connection between the RF identification circuit and the individualised optical security feature. It is of particular advantage here that the high temperatures which occur in the welding operation do not lead to destruction of the individualised optical security element by virtue of the specific arrangement of the plastic body and the individualised optical security element.

Furthermore it is also possible for the single-layer or multi-layer film body and the plastic body having the at least machine-readable security element to be permanently connected together by means of a permanent adhesive, preferably by means of a radiation-hardenable adhesive.

It is advantageous if the second part of the single-layer or multi-layer film body has an opening for completely or partially receiving the plastic body having the at least one machine-readable security element. That provides on the one hand that the plastic body can be easily positioned precisely on the film body and on the other hand that this prevents subsequent detachment of the plastic body from the single-layer or multi-layer film body without destroying for example the RF identification circuit. In order to achieve those advantages it is also further possible here to form on the single-layer or multi-layer film body one or more guide limbs which serve for positioning the plastic body having the at least one machine-readable security element.

Further advantages are achieved if a plastic body having the electronic RF identification circuit is arranged in the immediate proximity of the fold. By virtue thereof, on the one hand mechanic access to the plastic body and thus attempts at manipulation are made more difficult, while on the other hand in that fashion the increase in thickness which occurs due to the RF identification circuit is pushed into the background, for the person viewing it.

Thus in accordance with a preferred embodiment of the invention the first part of the single-layer or multi-layer film body is of a surface area dimension which is matched to the pages of the security document whereas the second part of the single-layer or multi-layer film body is of a markedly smaller width, namely a width of less than 10 mm, preferably 5 to 60 mm.

In order further to increase the forgery-proof nature of the security document it is proposed that a plastic body having the electronic RF identification circuit is of an at least partially transparent configuration and that provided in the second part of the single-layer or multi-layer film body are one or more individualised security elements which at least region-wise are superimposed by or integrated into the plastic body. Thus for example the region of the film body to which the plastic body with the RF identification circuit is to be applied is also provided with an individualised print thereon, for example with a passport number, upon individualisation of the security element.

In addition it is also possible for a plastic body having the electronic RF identification circuit to be provided with an individualised print thereon, of that kind.

A further increase in the forgery-proof level of the security document can be achieved if a plastic body having the electronic RF identification circuit has an optically variable element. An optically variable element of that kind comprises for example a structure having an optical-diffraction effect, for instance a Hologram® or Kinegram®. The absence or manipulation of the plastic body having the RF identification circuit thus becomes immediately apparent due to the absence of the optically variable element or the destruction or partial destruction of the optically variable element.

In addition it is also possible here for an optically variable element to be also provided in the second part of the single-layer or multi-layer film body, which optically variable element is arranged in adjacent relationship with the first optically variable element of the film body having the at least one machine-readable security element and showing a representation which supplements the first optically variable element. Absence or destruction of the optically variable element of the film body containing the at least one machine-readable security element, in particular the electronic RF identification circuit, thus becomes immediately apparent.

In accordance with a further preferred embodiment of the invention the second part of the single-layer or multi-layer film body has an optically variable element which is arranged at least in region-wise manner in superimposing relationship with the optically variable element of the film body. Thus for example optically variable elements which have structures with an optical-diffraction effect, partial metallizations or thin film layers producing colour shifts can be arranged in mutually superposed relationship in region-wise manner. The optical effect afforded for the viewer is determined by the mutually superposed optically variable elements so that the absence or destruction of one of the two optically variable elements becomes immediately obvious. Preferably in that respect a concealed optical effect becomes visible by virtue of superimposition of the two optically variable elements. For that purpose the two optically variable elements have for example moiré patterns or microlens rasters in which a concealed item of information is encoded. In that respect, by virtue of a suitable choice of the optically variable elements, it is also possible to achieve the concealed optical effect only upon precise positioning of the plastic body, whereby the level of forgery-proof nature is further enhanced.

It is further possible to apply to a plastic body containing the RF identification circuit, after application to the film body, a transfer layer of a transfer film which has an optically variable element. Upon an attempt to detach the plastic body from the film body the transfer layer and therewith the optically variable element containing the transfer layer are destroyed, whereby a further increase in the forgery-proof nature is achieved.

Preferably the electronic RF identification circuit is individualised before the plastic body is permanently connected to the second part of the single-layer or multi-layer film body. Thus it is possible to test the operability of the RF identification circuit before the RF identification circuit is permanently joined to the film body, and to prevent the entire security document having to be replaced when faults occur in the RF identification circuit.

It is further advantageous for the plastic body having the at least one machine-readable security element to be permanently connected to the second part of the single-layer or multi-layer film body only after individualisation of the individualised optical security element, in particular only after the film body has been incorporated into the security document. Thus it is possible for example for a passport which has already been issued to be also subsequently provided with the at least one machine-readable security element and supplemented in modular fashion. That provides a further individualisation option for security documents, which hitherto did not exist.

BRIEF DESCRIPTION OF THE DRAWINGS

The invention is described by way of example hereinafter by means of a number of embodiments with reference to the accompanying drawing in which.

DETAILED DESCRIPTION OF THE INVENTION

Figure 1:
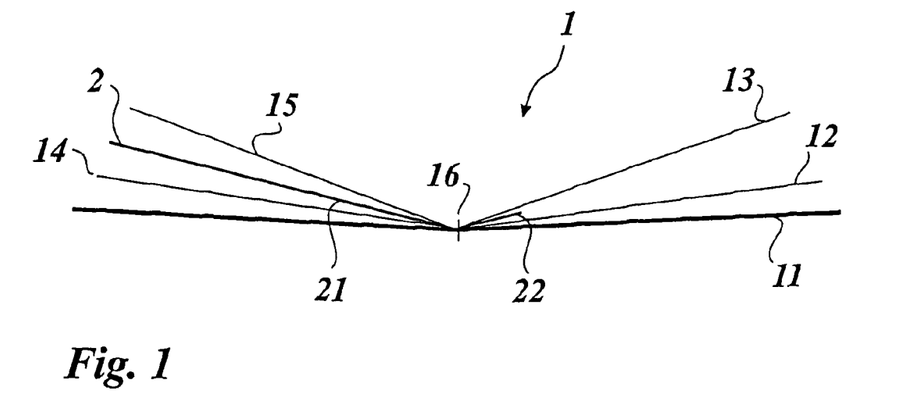
FIG. 1 shows a diagrammatic view of a security document according to the invention.

FIG. 1 shows an opened, individualised security document 1 which is a passport. It is however also possible for the security document to be for example a driving licence, a notarial certificate, an authenticity, licence or guarantee certificate.

The security document 1 has an outside cover 11, a plurality of pages 12, 13, 14 and 15 as well as a film body 2 in page form, which are connected together by means of stitching 16 indicated in FIG. 1.

The pages 12 to 15 preferably involve pages of a paper material, which are provided with printing thereon. The pages 12 to 15 are stitched to each other and to the film body 2 inserted between them, in the form of a double-page stack along the line of the bisector, by a row of stitches with a thread using a thread sewing machine. Preferably in that case an adhesive is applied along the seam, whereby the stitching thread becomes impregnated with the adhesive by virtue of the capillary action of the thread. The adhesive is then dried or—if it is a UV-hardenable adhesive—it is hardened by UV irradiation by means of a UV lamp. Impregnation with adhesive increases the mechanical readability and the forgery-proof nature of the security document as the adhesive which is applied along the stitching thread forms a part of the back of the book and no raised configuration is formed on the stitching thread on the inside where the book is opened/closed.

It is however also possible to dispense with impregnating the stitching thread with adhesive.

Furthermore it is also possible for the pages 12 to 15 and the film body 2 to be also connected together by means of stapling or by means of adhesive.

The outside cover 11 is then attached as the cover of the document and the mutually superposed double pages as well as the film body 2 and the outside cover 11 are folded at the centre along the stitching thread so that the assembly assumes the form of a passport.

As can be seen from FIG. 1 the film body 2 is divided by the fold into two parts, a part 21 which is approximately of the dimensions of one of the pages 12 to 15 of the security document 1, and a part 22 which adjoins the stitching 16 in a flap form and the width of which is considerably less than that of the adjacent pages 12 and 13 of the security document 1.

Figure 2:
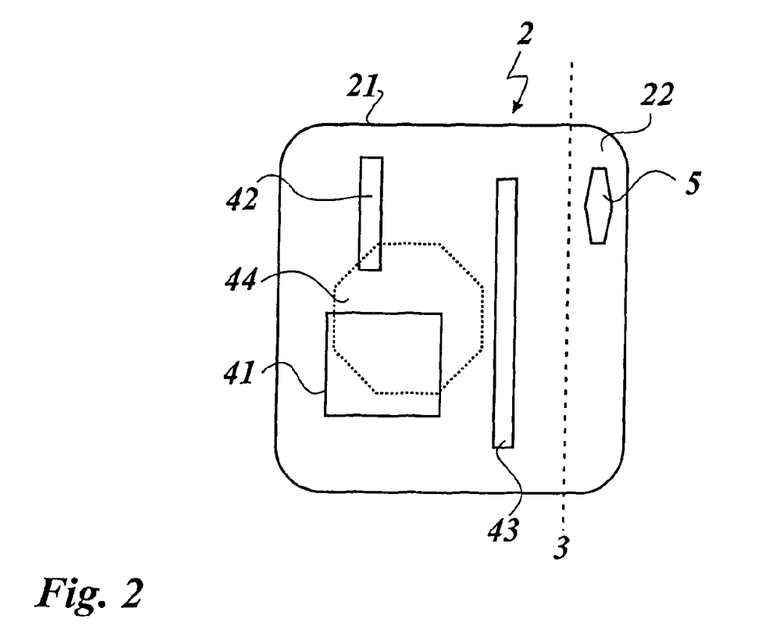
FIG. 2 shows a diagrammatic plan view of a film body used in the security document of FIG. 1.

A plan view of the film body 2 is shown in FIG. 2.

FIG. 2 shows the film body 2 which has a fold 3 indicated in FIG. 2, along the stitched seam 16. The fold 3 divides the film body 2 into the parts 21 and 22. The part 21 has a plurality of individualised optical security elements 41, 42 and 43. The individualised security element 41 is a photograph of the passport holder. The individualised security element 42 is a passport number and further information regarding the person of the passport holder. The individualised security element 43 is a machine-readable code which contains for example the items of information of the security element 42 in machine-readable form, for example as a bar code or as a machine-readable letter/digit combination.

As indicated in FIG. 2, in this case the individualised optical security elements 41 and 42 have superimposed thereon a transparent optically variable element 44 which is for example a hologram or a Kinegram®. It is also possible for the individualised optical security element 43 also to be superposed by an optically variable element of that kind or for the security document to have only a single individualised security element.

A plastic body 5 having an electronic circuit for RF identification is arranged on the part 22 of the film body 2 and permanently connected to the film body 2.

Preferably the plastic body 5 in this case is positioned as close as possible to the fold 3 on the film body 2 and the width of the part 22 is so selected that the part 22 projects only slightly beyond the plastic body 5. Preferably the part 22 is of a width of 5 to 40 mm.

It is however also possible for the film body to be of a surface area dimension which corresponds to the size of a double page.

The film body 2 is preferably a film body whose stiffness is reduced in the region of the fold 3. That can be achieved by not all layers of the single-layer or multi-layer film body 2 being present in the region of the fold 3, for example being severed in the region of the fold 3, or by one or more layers of the film body 2 being provided only in the part 21. Furthermore it is also possible that, in the region of the fold 3, the single-layer or multi-layer film body has a strip-shaped insert of a more flexible material, which connects the parts 21 and 22 together and comprises a plastic material which is not provided in any one of the layers of the parts 21 and 22. Furthermore it is also possible for one or more layers of the film body 2 to be weakened in the region of the fold 3 by perforations and thus for the stiffness of the film body 2 to be reduced in the region of the fold 3. Furthermore it is possible for the layer thickness of one or more layers of the film body 2 to be reduced in the region of the fold 3 in order thus to achieve equally that effect.

Figure 3:
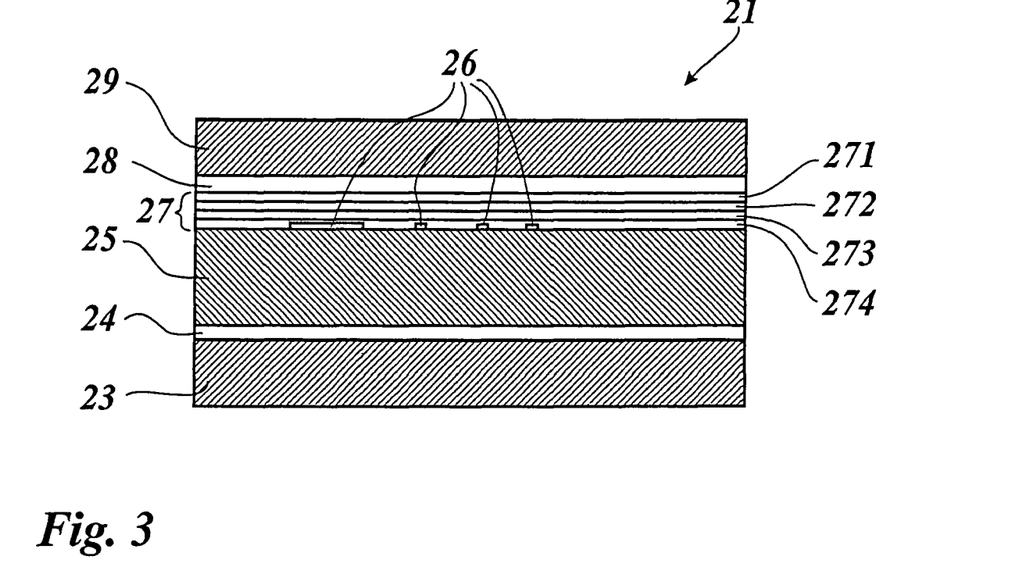
FIG. 3 shows a sectional view which is not true to detail of a first part of the film body of FIG. 2.

FIG. 3 shows by way of example a sectional view of the film body 2 in the region of the individualised optical security element 41.

FIG. 3 shows the part 21 of the film body 2, which comprises a cover layer 23, an adhesive layer 24, a core layer 25, a decorative layer means 27, an adhesive layer 28 and a cover layer 29. The cover layer 23, the core layer 25 with the decorative layer means 27 as well as the cover layer 29 are laminated to produce the film body 2 in a laminating process by means of heat and pressure. If the material of the cover layers 23 and 29 and the core layer 25 is suitably selected to achieve a permanent join between the adjacent layers in the laminating operation, it is also possible to dispense with the adhesive layers 24 and 28. The overall structure, in the welded condition of the individual layers, is approximately 300 µm to 900 µm in thickness. The cover layers 29 and 23 preferably comprise a thermoplastic polyester or polycarbonate of a thickness of 20 to 150 µm. The core layer 25 preferably comprises an opaque material, for example a paper carrier of a thickness of 100 to 300 µm, which is provided with printing thereon. The layer thicknesses 24 and 28 are of a layer thickness of 2 to 10 µm, preferably 3 to 6 µm, and comprise a thermally activatable adhesive.

The film body 2 can further comprise a paper inlet, preferably of security paper, and cover films at one or both sides.

To produce the film body 2, firstly individualised printing 26 is applied to the core layer 25, for example by means of an inkjet printer, which printing 26 has the individualised items of information already described with reference to FIG. 2, and forms an individualised optical security element. In this respect it is also possible for a part of the printing 26 or the entire printing 26 to be produced by means of a printing material which contains an effect pigment, for example an interference layer pigment or a cholesteric liquid crystal pigment. After the individualisation step the decorative layer means 27 is applied to the core layer 25 which has been individualised by the printing 26 thereon. The decorative layer means 27 is preferably the transfer layer of a hot stamping film which is applied to the core layer 25 by the action of heat or pressure, over the full area or only partially, for example in the region of the optically variable element 44. Preferably in that case the decorative layer means 27 at least partially covers the region of the individualised printing 26.

In this case the decorative layer means 27 comprises a bonding agent layer 271, a replication lacquer layer 272, an optical separating layer 273 and an adhesive layer 274.

The adhesive layer 274 is preferably a thermally activatable adhesive of a layer thickness of 3 to 6 µm.

The replication lacquer layer 272 comprises a thermoplastic lacquer in which a diffractive surface structure is replicated by means of the action of heat and pressure by means of a stamping tool. The replication lacquer layer is of a thickness of about 0.05 to 1.5 µm. The diffractive surface structure is for example a hologram or a Kinegram® or another grating structure which is optically-diffractively active and which is determined by structural parameters such as grating frequency, structure depth, shape of structure and azimuth angle. In this case the replication lacquer layer 272 is preferably applied to the bonding agent layer 271 over the full surface area by means of a printing process and then dried in a drying passage. Replication of the diffractive surface structure is then effected by means of a heated stamping punch. It is also possible to use a UV-cross-linkable lacquer as the replication lacquer and to produce the diffractive surface structure by means of UV replication.

The optical separating layer 273 is then applied to the replication lacquer layer 272. The optical separating layer 273 is preferably an HRI or LRI layer (HRI=high refraction index, LRI=low refraction index), whose refractive index is markedly different from that of the replication lacquer layer 272 so that the optical-diffraction effect produced by the diffractive structure becomes visible to the viewer. The separating layer 273 in this case is formed for example by a vapour-deposited layer of a metal oxide, metal sulphide, titanium dioxide and so forth, of a thickness of 10 to 500 nm.

It is also possible, instead of or in addition to the layers 272 and 273, to introduce into the decorative layer still further layers which generate an optically variable effect. Thus it is possible for example to provide a thin film layer system which produces a viewing angle-dependent colour shift effect, or a partially implemented metallisation in the decorative layer 27.

Furthermore it is also possible to dispense with the bonding agent layer 271 if there is sufficient adhesion between the replication lacquer layer 272 and the adhesive layer 28 or the cover layer 29 during the laminating process.

After the decorative layer 27 is applied to the core layer 25 the film body 2 is produced in a laminating process by over-lamination of the cover layers 23 and 29 thereon.

Furthermore it is also possible to dispense with over-lamination of the cover layers 23 and 29 and to apply a film body containing the decorative layer 27, preferably as part of a transfer layer, to the core layer 25 which has been individualised by the individualised printing 26. In that case, instead of the bonding agent layer 271, the decorative layer 27 has a protective lacquer layer or additionally a carrier layer which remains on the bonding agent layer 271, as is shown for example in WO 2004/011272 A2.

In addition it is also possible for individualisation of the film body 2 to be effected by a laser labelling method, in addition to or instead of the individualised printing 26. In that method individualised information is introduced into the film body 2 by burning out or generating a colour change in one or more layers of the decorative layer means 27 or the core layer 25.

In addition it is also possible to dispense with the core layer 25 or to use a transparent plastic film or a security paper as the core layer 25. Furthermore the core layer 25 can also be provided only on part of the surface area in the film body 2 and can extend for example only over a card-shaped region in the part 21 of the film body 2. In the region of the film body 2, which surrounds that card-shaped region, the cover layers 23 and 28 thus lie directly over each other.

Figure 4A:
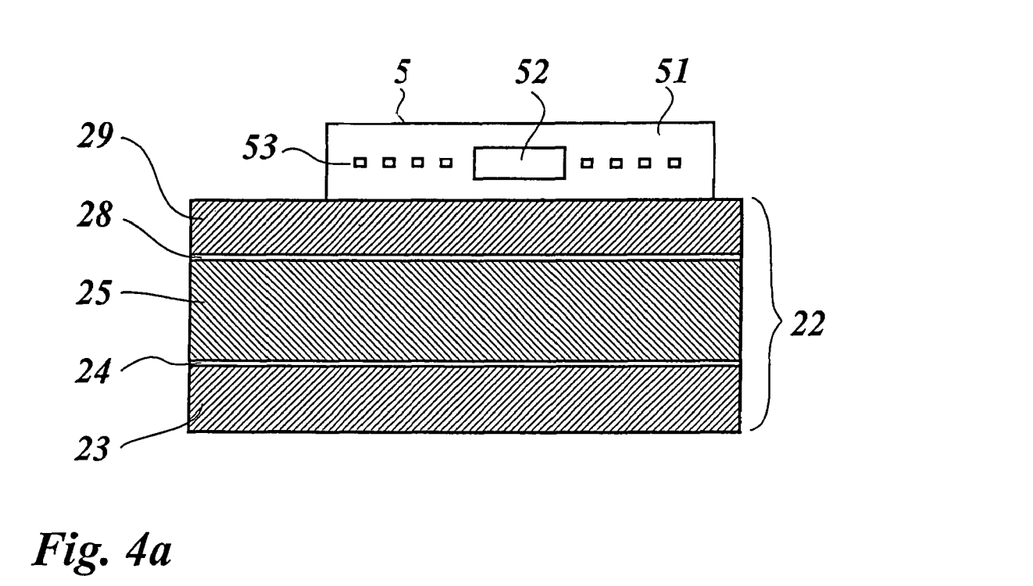
FIG. 4a shows a sectional view which is not true to scale of a second part of the film body of FIG. 2, and FIGS. 4b and 4c show sectional views of further film bodies.

FIG. 4a shows a portion of the part 22 of the film body 2 with the plastic body 5.

The plastic body 5 preferably comprises a thin flexible film body of a layer thickness of 100 to 400 µm, which has an electronic circuit 52 laminated in between two and more transparent polyester carriers or polycarbonates, and an RF antenna 53.

The electronic circuit 52 preferably comprises an integrated circuit which is produced using silicon technology and which is applied to a thin silicon carrier. That circuit preferably has a microprocessor with associated memory as well as peripheral driver components, which permits communication of that microprocessor by way of the radio interface serviced by means of the RF antenna. The power supply for the microprocessor is also implemented in this case by way of the RF antenna 53 which feeds the microprocessor with the electromagnetic radiation energy induced in the antenna. In this case the microprocessor has a memory region with items of individualised identification information or authentication information, for example biometric information, passport number, details relating to the passport holder or a (secret) key allocated to the holder of the passport.

In addition it is also possible for the electronic circuit 52 not to be based on conventional silicon technology but for the circuit to be an organic semiconductor circuit.

The antenna 53 preferably comprises a conductor track of an electrically conductive material arranged in loop form, but it can also comprise a thin wire which is laminated or cast in position or a conductive paste which is applied in the desired antenna shape or a thin layer of a conductive material which is structured in accordance with the desired antenna structure by positive/negative etching, corresponding printing or ablation, for example laser ablation.

As already stated hereinbefore the antenna 53 and the electronic circuit 52 are laminated in between one or more layers of a polyester material or polycarbonate and thus enclosed by a plastic material 51 which determines the external configuration of the plastic body 5. In addition it is also possible for the plastic body 5 to be a cast body so that the antenna 53 and the electronic circuit 52 are in that way embedded in the plastic material.

As indicated in FIG. 4*a* the plastic body 5 is welded to the cover layer 23 of the film body 2 by a laminating operation so that the plastic material 51 of the plastic body 5 and the cover layer 23 are firmly durably joined. Instead of welding of the plastic body 5 it is also possible for the plastic body 5 to be permanently connected to the cover layer 23 of the film body 2 by means of a permanent adhesive, preferably a radiation-hardenable adhesive.

In addition it is also possible for the plastic body 5 to be permanently connected to the film body 2 by riveting by means of plastic rivets or in some other fashion.

Figure 4B:
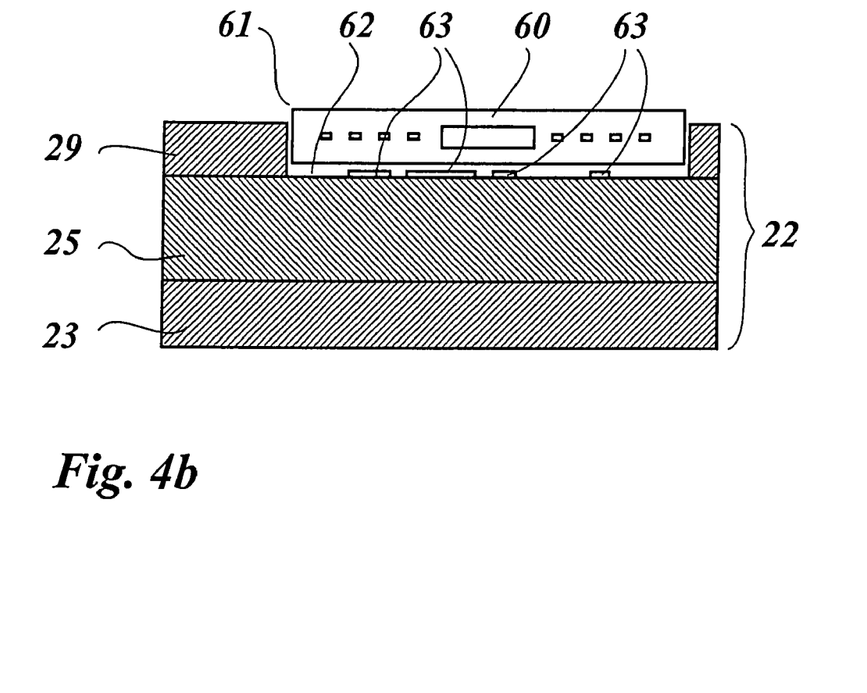

FIG. 4*b* shows a further possible form of the permanent connection of a plastic body 60 having an electronic RF identification circuit to the part 22 of the film body 2. FIG. 4*b* shows the part 22 with the laminated layers 23, 25 and 29. An opening 61 adapted to the configuration of the plastic body 60 is shaped out in the film body 2, in the region of the plastic body 60. Preferably, for that purpose, prior to lamination of the cover layer 29 to the core layer 25, a suitably shaped window is incorporated into the cover layer 29 by cutting or stamping so that the plastic body 60 can be positioned in the opening 61 as shown in FIG. 4*b* and permanently connected to the film body 2.

In accordance with the embodiment of FIG. 4*b*, upon individualisation of the optical security elements 41, 42 and 43, at the same time the core layer 25 is provided with individualised printing 63 thereon, in the region of the later opening 61. That is then followed by the operation of applying the decorative layer 27 as well as the operation of laminating the layers of the film body 2 and the operation of binding the film body 2 and the pages 12 to 15 into the security document 1. The plastic body 60 which is like the plastic body 5 shown in FIG. 4*a*, with the proviso that the plastic material 51 comprises a transparent plastic material, is then permanently connected to the core layer 25 and preferably also in the edge region to the cover layer 29, by means of a layer comprising a permanent adhesive 62. An optical security element formed by the individualised printing 63 is now visible to the viewer through the plastic body 60, and that affords a further increase in the forgery-proof level.

Figure 4C:
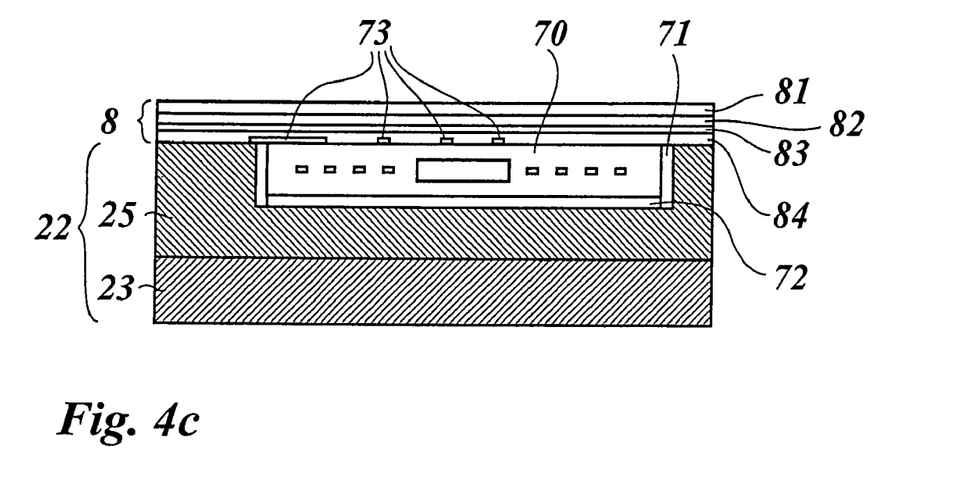

FIG. 4*c* now shows a further option of permanently fixing a plastic body 70 having an electronic RF identification circuit to the part 22 of the film body 2.

FIG. 4*c* shows the layers 25 and 23 of the part 22, which are laminated together. Incorporated into the core layer 25 is an opening 71, the configuration of which corresponds to the external shaping of the plastic body 70.

The opening 71 can be produced here for example by stamping or embossing and can also be in the form of a complete, window-like aperture in the core layer 25. It is also possible for the opening 71 to extend also into the cover layer 23.

As already described with reference to FIG. 7*b* the plastic body 70 which is like the plastic body 5 of FIG. 4*a* is positioned in the opening 71 after the laminating operation and joined to the core layer 25 by means of a permanent adhesive. In this case also it is possible for the plastic body—as described above—to be connected to the film body 2 by means of welding or riveting if the core layer 25 is of a corresponding material which is suitable for that purpose (for example thermoplastic material).

The cover layer 29 in the embodiment of FIG. 4*c* does not cover the entire surface area and is not present at least in the surrounding region of the opening 71. After the plastic body 70 is permanently connected to the core layer 25, individualised printing 73 which for example contains one or more of the items of information described with reference to FIG. 2 is applied to the core layer 25 and the film body 70. A transfer layer 8 of a transfer film is then applied to the core layer 25 and the plastic body 70 so that at least both a part of the plastic body 70 and also a part of the core layer 25 surrounding that plastic body is covered with the transfer layer 8.

The transfer layer 8 is like the decorative layer means 27 of FIG. 3 and has an adhesive layer 84, an optical separating layer 83, a replication lacquer layer 82 with a diffractive surface structure, and a protective lacquer layer 81. The transfer layer 8 provides a transparent, optically variable element in the region of the opening 71, which is at least partially superimposed on the film body 70. If the attempt is made to detach the film body 70 from the core layer 25, that optically variable element is destroyed, whereby manipulation of that nature becomes immediately obvious.

In addition it is also possible for the film body 70 to have a preferably reflective, optically variable element which is positioned in adjacent relationship or superposed relationship with the optically variable element of the transfer layer 8. If the two optically variable elements exhibit supplementary or mutually superposed effects, attempts at manipulation can be quickly and reliably detected.

In addition it is also possible for the protective lacquer layer 81 of the transfer layer 8 to be replaced by the bonding agent layer 271 of FIG. 3 and—as in FIG. 3—for the cover layer 29 to be laminated over the transfer layer 8.

The invention claimed is:

1. An individualized security document which has a number of pages which are connected together by means of stitching or adhesive, wherein, integrated into the security document by means of stitching or adhesive, is a single-layer or multi-layer film body which is provided with an individualized optical security element and which is folded in the region of the stitching or adhesive, wherein the fold divides the film body into a first part on which the individualized optical security element is arranged and a second, flap-shaped part which is permanently connected to a plastic body having at least one machine-readable security element, whereby the plastic body is arranged on the second part of the film body, and wherein the at least one machine-readable security element has an electronic circuit for RF identification, and wherein the plastic body having the at least one machine-readable security element has a first optically variable element, and wherein the first part of the single-layer or multi-layer film body is of an area dimension matched to the pages of the security document and the second part of the single-layer or multi-layer film body is of a width of 5-60 mm.

2. An individualized security document according to claim 1, wherein, beside the RF identification circuit, the plastic body has at least one further machine-readable security element.

3. An individualized security document according to claim 2, wherein, the further machine-readable security element includes electrically or magnetically or optically readable information.

4. An individualized security document according to claim 1, wherein the single-layer or multi-layer film body and the plastic body having the at least one machine-readable security element are welded together.

5. An individualized security document according to claim 1, wherein the single-layer or multi-layer film body and the plastic body having the at least one machine-readable security element are permanently connected together by means of a permanent adhesive.

6. An individualized security document according to claim 1, wherein the single-layer or multi-layer film body and the plastic body having the at least one machine-readable security element are connected together by means of riveting.

7. An individualized security document according to claim 1, wherein the second part of the single-layer or multi-layer film body has an opening for completely or partially receiving the plastic body having the at least one machine-readable security element.

8. An individualized security document according to claim 1, wherein the plastic body having the at least one machine-readable security element is arranged in the immediate proximity of the fold.

9. A security document according to claim 1, wherein the plastic body having the at least one machine-readable security element is at least partially transparent and the second part of the single-layer or multi-layer film body has at least one individualized security element which is superposed at least region-wise by the plastic body.

10. A security document according to claim 1, wherein the plastic body having the at least one machine-readable security element is provided with individualized printing thereon.

11. A security document according to claim 1, wherein the first part of the single-layer or multi-layer film body has an optically variable element which is arranged in adjacent relationship with the first optically variable element of the film body and shows a representation supplemental to the first optically variable element.

12. A security document according to claim 1, wherein the first part of the single-layer or multi-layer film body has an optically variable element which is arranged at least region-wise in superposed relationship with the first optically variable element of the film body.

13. A security document according to claim 12, wherein a concealed optical effect becomes visible due to the superpositioning of the first and second optically variable elements.

14. A security document according to claim 1, wherein, applied to the plastic body is a transfer layer of a transfer film which has an optically variable element.

15. A method of individualizing a security document, wherein the security document has a number of pages which are connected together by means of stitching or adhesive, wherein, a single-layer or multi-layer film body which is incorporated into the security document by means of stitching or adhesive and which is folded in the region of the stitching or adhesive and in which the fold divides the film body into a first part and a second flap-shaped part, is provided in the first part with an individualized optical security element and the second part is permanently connected to a plastic body having at least one machine-readable security element, whereby the plastic body is arranged on the second part of the film body, wherein the at least one machine-readable security element has an electronic circuit for RF identification, and wherein the plastic body having the at least one machine-readable security element has a first optically variable element, and wherein the first part of the single-layer or multi-layer film body is of an area dimension matched to the pages of the security document and the second part of the single-layer or multi-layer film body is of a width of 5-60 mm.

16. A method according to claim 15, wherein the at least one machine-readable security element is individualized before the plastic body is permanently connected to the second part of the single-layer or multi-layer film body.

17. A method according to claim 15, wherein the plastic body having the at least one machine-readable security element is permanently connected to the second part of the single-layer or multi-layer film body only after individualization of the individualized optical security element.

18. A method according to claim 17, wherein the plastic body having the at least one machine-readable security elements is permanently connected to the second part of the single-layer or multi-layer film body only after the single-layer or multi-layer film body is bound into the security document.

19. An individualized security document comprising:

a plurality of pages connected together at a seam to form a book; and a single-layer or multi-layer film body connected to said pages at said seam, said seam dividing said film body into a first part and a second, flap-shaped part, said first part having an individualized optical security element and said second part having a plastic body disposed on a surface of said second part and permanently connected thereto and an optically variable element superposed over said plastic body, said plastic body having at least one machine-readable security element including an electronic circuit for RF identification, and wherein the first part of the single-layer or multi-layer film body has a surface area dimension matching the surface area dimension of said plurality of pages and said second part of the single-layer or multi-layer film body has a width smaller than the width of the first part, said width of the second part being between 5 and 60 mm.

20. An individualized security document as defined in claim 19, wherein said optically variable element comprises a transfer layer applied over said plastic body, whereby said plastic body is disposed between said second part of said film body and said transfer layer, said transfer layer including a replication lacquer layer with a diffractive surface structure for producing an optically variable effect.

21. An individualized security document as defined in claim 20, wherein said transfer layer further comprises:

an adhesive layer disposed between said second part of said film body and said replication lacquer layer;

an optical separating layer disposed between said adhesive layer and said replication lacquer layer; and a protective layer disposed on said replication lacquer layer, said replication layer being disposed between said optical separating layer and said protective layer.

22. An individualized security document as defined in claim 20, wherein said second part of said film body includes a pocket formed therein, said plastic body being received in said pocket and said transfer layer covering said pocket.

23. An individualized security document as defined in claim 22, wherein said transfer layer further covers at least a portion of said second part of said film body surrounding said pocket.

24. An individualized security document as defined in claim 20, wherein said plastic body has individualized printing applied thereon, said transfer layer being applied over said printing such that said printing is visible through said transfer layer.

25. An individualized security document as defined in claim 19, further comprising an outside cover attached to said plurality of pages and said single-layer or multi-layer film body at said seam.

\* \* \* \* \*